(12) United States Patent
Li

(10) Patent No.: US 9,983,694 B2
(45) Date of Patent: May 29, 2018

(54) KEY AND MOUSE

(71) Applicant: G. TECH TECHNOLOGY LTD., Guangdong (CN)

(72) Inventor: Baisong Li, Guangdong (CN)

(73) Assignee: G.TECH TECHNOLOGY LTD., Guangdong (CN)

( * ) Notice: Subject to any disclaimer, the term of this patent is extended or adjusted under 35 U.S.C. 154(b) by 0 days. days.

(21) Appl. No.: 15/303,780

(22) PCT Filed: Jan. 19, 2016

(86) PCT No.: PCT/CN2016/071366
§ 371 (c)(1),
(2) Date: Oct. 13, 2016

(87) PCT Pub. No.: WO2016/145945
PCT Pub. Date: Sep. 22, 2016

(65) Prior Publication Data
US 2018/0011559 A1    Jan. 11, 2018

(30) Foreign Application Priority Data

Mar. 18, 2015 (CN) .......................... 2015 1 0120071

(51) Int. Cl.
*G06F 3/00* (2006.01)
*G06F 3/0354* (2013.01)
(Continued)

(52) U.S. Cl.
CPC ......... *G06F 3/03543* (2013.01); *H01H 13/10* (2013.01); *H01H 13/14* (2013.01);
(Continued)

(58) Field of Classification Search
CPC .......................... G06F 3/03543; H01H 13/10; H01H 2215/03; H01H 2233/07; H01H 13/20; H01H 13/14
See application file for complete search history.

(56) References Cited

U.S. PATENT DOCUMENTS 6,243,078 B1 * 6/2001 Rosenberg .............. A63F 13/06
345/161
6,611,139 B1 * 8/2003 Jackson .............. G06F 3/03543
200/6 A
7,205,980 B2 4/2007 Maroun

FOREIGN PATENT DOCUMENTS

CN    1017 76959    7/2010
CN    1028 32067    12/2012
(Continued)

*Primary Examiner* — Muhammad N Edun
(74) *Attorney, Agent, or Firm* — Occhiuti & Rohlicek LLP

(57) ABSTRACT

A key includes a cap, a spring, a magnet, a spring supporting device, an upper limit device, a lower limit device, a displacement detection device, and a displacement determination device; the spring is located below the cap and, the spring is disposed on the spring supporting device; the magnet is placed on either of the upper limit device or lower limit device; the spring is magnetically pressed against the magnet; the displacement detection device is mounted on the spring and moves between the upper limit device and lower limit device following deformation of the spring; the cap is configured to generate a click motion; the displacement determination device is located at one side of the displacement detection device; the device moves back and forth with respect to the displacement determination device following the movement of the spring; and the displacement determination device is electrically connected with an external circuit.

16 Claims, 3 Drawing Sheets

(51) Int. Cl.
    *H01H 13/14*     (2006.01)
    *H01H 13/10*     (2006.01)
    *H01H 13/20*     (2006.01)

(52) U.S. Cl.
    CPC ......... *H01H 13/20* (2013.01); *H01H 2215/03* (2013.01); *H01H 2233/07* (2013.01)

(56) References Cited

FOREIGN PATENT DOCUMENTS

| | | |
|---|---|---|
| CN | 1046 81337 | 6/2015 |
| CN | 2046 96004 | 10/2015 |
| JP | 2003 140826 | 5/2003 |

\* cited by examiner

KEY AND MOUSE

CROSS REFERENCE TO RELATED APPLICATIONS

This application is a US National Stage, under 35 USC 371, of International Application No. PCT/CN2016/071366, filed on Jan. 19, 2016, which claims the benefit of the Mar. 18, 2015 priority date of Chinese application CN201510120071.X, the contents of which are herein incorporated by reference.

FIELD OF THE INVENTION

The present invention relates to an operation device and more particularly, to a key and mouse.

BACKGROUND OF THE INVENTION

There are two kinds of mouse devices in accordance with their working principle and activation of the keys. One is micro and tactile switch type mouse, which features a micro resilient tab inside the switch. The tab is able to generate a feeling of click motion. However, as limitation is imposed onto material and size of the micro resilient tab, materials of the tab, contact and cap are limited as well. The lifetime of this kind of mouse is at most 2000,000 cycles due to restriction of wear-ability and fatigue. The mouse generally will stop operation after 3-4 months especially for users of internet bars, gaming bars, drawing making, and word editing where the mouse is used with a high frequency. Another kind of mouse is touch mouse, which works by touching action of the user. This kind of mouse has the advantage of long lifetime. It also bears disadvantage of causing tiredness of user hand due to lack of feeling of discontinuous resistance. Accordingly, this kind of mouse is not suitable for quick click and longtime use.

With the development of computers, nowadays mouse of long life and good operation experience is required in applications where users of gaming, internet bars, word editing and drawing making desire quick and frequent use of the mouse in order to perform inputting operation rapidly and avoid tiredness of the users.

SUMMARY OF THE INVENTION

The main object of the invention is to overcome drawbacks of prior art and provide a key and mouse which can be made with simple process, low cost, and which has adjustable travel distance, stable tactility, low wear, good contact stability, long life and good operation experience.

The technical solution proposed by the current application is described as follows.

A key of the invention includes a cap; the key further includes a spring, a magnet, a spring supporting device, an upper limit device, a lower limit device, a displacement detection device, and a displacement determination device; the spring is located below the cap and in addition, the spring is disposed on the spring supporting device; the magnet is placed on either of the upper limit device or lower limit device; the spring is magnetically pressed against the magnet; the displacement detection device is mounted on the spring and moves between the upper limit device and lower limit device following deformation of the spring; the cap is configured to generate a click motion; the displacement determination device is located at one side of the displacement detection device; the device moves back and forth with respect to the displacement determination device following the movement of the spring; and the displacement determination device is electrically connected with an external circuit.

Preferably, the magnet is positioned close to one side of the upper limit device; and the lower limit device has a sound absorbing layer by which when the spring contacts the lower limit device, no sound will be generated.

Preferably, the key further includes a pushing mechanism located underneath the cap, and a bottom of the pushing mechanism is pressed against the spring.

Preferably, the spring is a torsion spring, compression spring, tension spring, belleville spring, or flat spring.

Furthermore, the displacement determination device is an optical coupling tube, capacitive sensor, or displacement sensor.

Also proposed is a mouse, which includes a key of the above construction, a main circuit board, a mouse detection chip, and a mouse bottom casing. The main circuit board is mounted on the mouse bottom casing, while the mouse detection chip is mounted on the main circuit board. The displacement determination device is electrically connected with the main circuit board.

Preferably, the mouse detection chip includes:
a displacement information scanning module for scanning and sampling the displacement detection device;
an information filter module for controlling a filter delay de-bouncing circuit to filter sampled values obtained by the displacement information scanning module;
an information determination module for controlling a Schmitt Trigger to compare the sampled values filtered by the information filter module, and for sending a key information to a key switch output module when the sampled values are larger than the maximum value set by the trigger; and
a key switch output module for receiving the key information from the information determination module and determining a corresponding code value based on the key information and reporting the same to a main computer.

Preferably, the filtering manners of the information filter module include mean filtering, IIR filtering and Jitter filtering.

Preferably, the cap is an entire upper closure of the mouse or only a single button cap for a mouse left key, middle key, or right key.

Preferably, the mouse also includes a power supply device, a mouse wheel, other keys, a DPI key, a wireless containing housing device, a trackball device, and a threaded locking device.

The current invention is able to obtain the following good effects.

A key of the invention includes: a cap; the key further includes a spring, a magnet, a spring supporting device, an upper limit device, a lower limit device, a displacement detection device, and a displacement determination device; the spring is located below the cap and in addition, the spring is disposed on the spring supporting device; the magnet is placed on either of the upper limit device or lower limit device; the spring is magnetically pressed against the magnet; the displacement detection device is mounted on the spring and moves between the upper limit device and lower limit device following deformation of the spring; the cap is configured to generate a click motion; the displacement determination device is located at one side of the displacement detection device; the device moves back and forth with respect to the displacement determination device following the movement of the spring; and the displacement determination device is electrically connected with an external circuit.

Pressing down the cap will urge the spring away from the magnet and move between the upper limit device and lower limit device, causing the spring being absorbed to or separated from the magnet, thus generating click motion. The displacement detection device is caused to move along the length of the displacement determination device, thereby triggering output of signals, and realizing switching operation of the key. This structure may be detected by an optical coupling tube, or capacitive sensor, or displacement sensor, eliminating use of micro and tactile switch type mouse. Therefore, the current invention brings improved durability, anti-fatigue and long lifetime of the product. This also leads to reliable electrical performance of the product. The keystrokes of the product of the invention are up to 70,000,000 times, and the product is not limited by switches. Moreover, when the cap is pressed down by the user, strong click motion may be generated, thus bringing a fully new operation experience to the user. In addition, the making process of the invention is relatively simple, introduces low cost, and which has adjustable travel distance, stable tactility, low wear, good contact stability, and long life. The mouse of the invention incorporating above key structure also makes the making process of the invention relatively simple, introduces low cost, and has adjustable travel distance, stable tactility, low wear, good contact stability, and long life. In addition, mouse with or without sound may be realized.

DETAILED DESCRIPTION OF THE INVENTION

Figure 1:
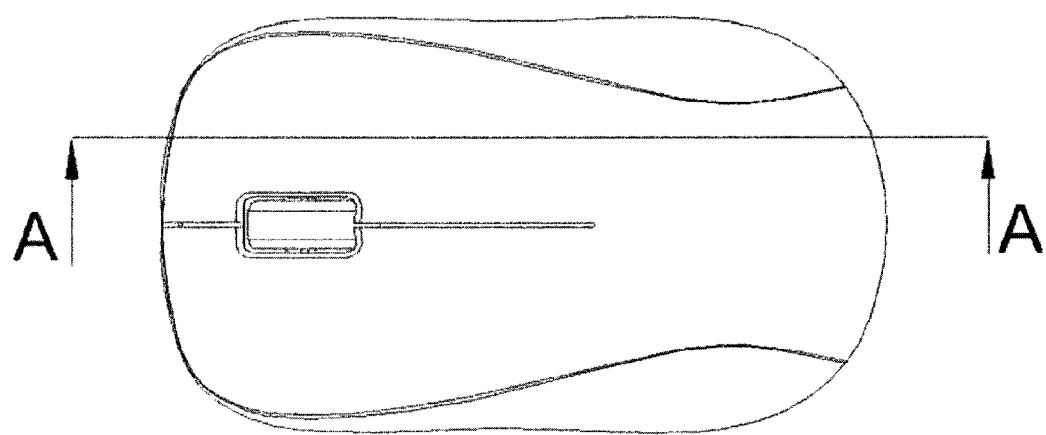
FIG. 1 shows an entire view of a key and mouse according to the invention.
Figure 2:
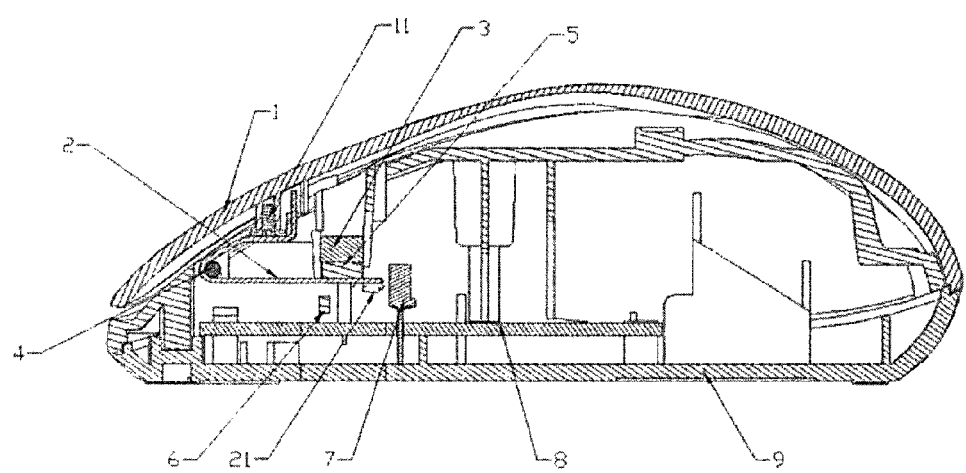
FIG. 2 shows a cross sectional view along line A-A of FIG. 1.
Figure 3:
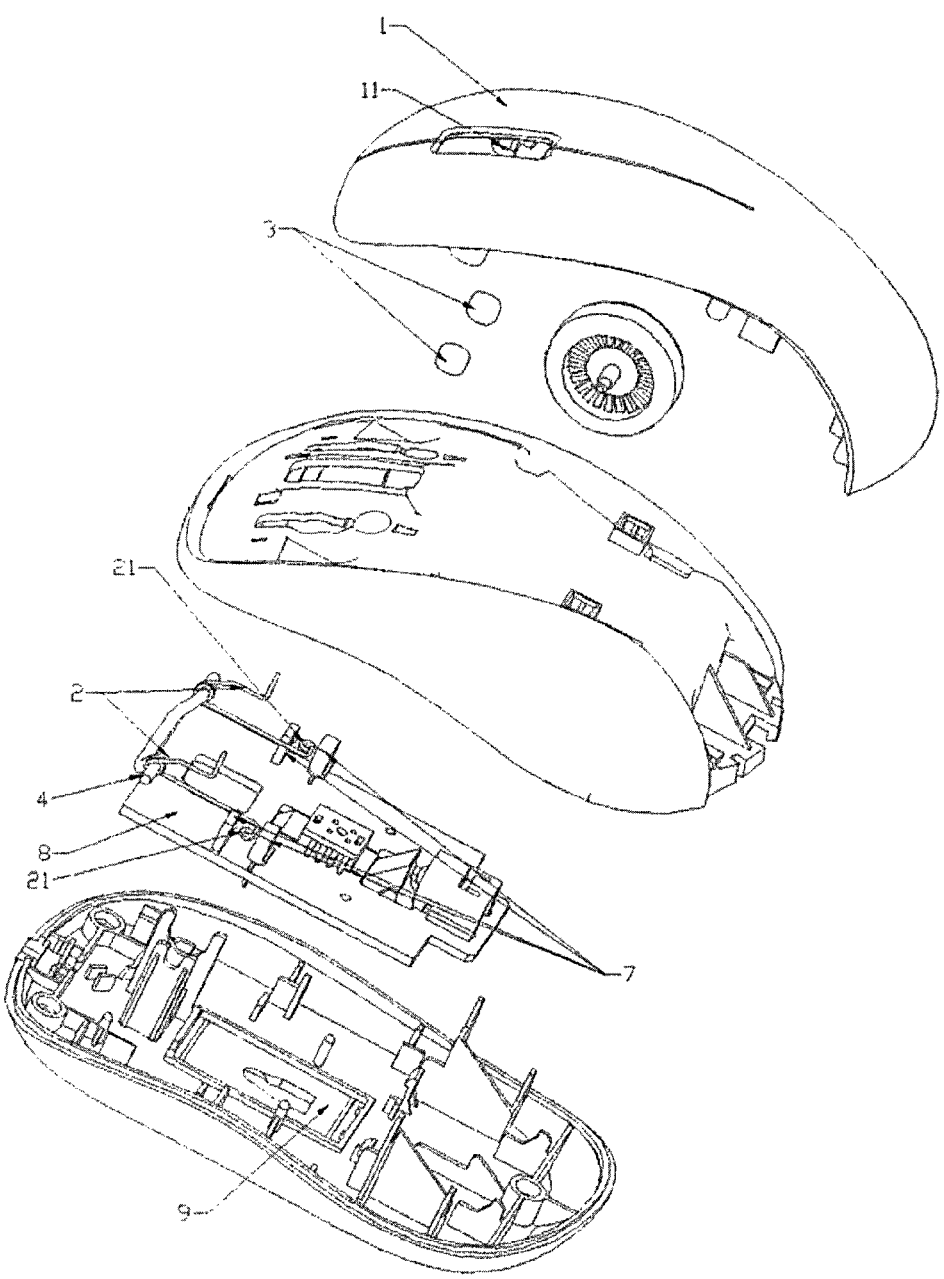
FIG. 3 shows an exploded perspective view of the mouse of the invention.

As shown in FIGS. 1-3, a key of the invention includes a cap 1. The key further includes a spring 2, a magnet 3, a spring supporting device 4, an upper limit device 5, a lower limit device 6, a displacement detection device 21, and a displacement determination device 7. The displacement determination device 7 is an optical coupling tube, capacitive sensor, or displacement sensor. The spring 2 may be a torsion spring, compression spring, tension spring, belleville spring, or flat spring. In this embodiment, a torsion spring is used as the spring 2. The spring 2 is located below the cap 2 and in addition, the spring 2 is disposed on the spring supporting device 4. The magnet 3 may be placed on either of the upper limit device or lower limit device. In this embodiment, the magnet 3 is positioned on the lower limit device. Of course, it may also be positioned on the upper limit device based on requirement. The lower limit device 6 has a sound absorbing layer by which when the spring 2 contacts the lower limit device 6, no sound will be generated. The spring 2 is magnetically pressed against the magnet 3. The displacement detection device 21 is mounted on the spring 2 and moves between the upper limit device 5 and lower limit device 6 following deformation of the spring 2. When the user's fingers push down the cap, the cap 1 will move. The displacement determination device 7 is located at one side of the displacement detection device 21. The device 21 moves back and forth with respect to the device 7 following the movement of the spring 2. The displacement determination device 7 is electrically connected with an external circuit. Pressing down the cap 1 will urge the spring 2 away from the magnet 3 and move between the upper limit device 5 and lower limit device 6, causing the spring 2 being absorbed to or separated from the magnet 3, thus generating click motion. In this case, the displacement detection device 21 is caused to move along the length of the displacement determination device 7, thereby triggering output of signals, and realizing switching operation of the key. The key further includes a pushing mechanism 11 located underneath the cap 1. A bottom of the pushing mechanism 11 is pressed against the spring 2.

The key of the invention may be used in input devices such as mice. It may also be used in keyboards and other handheld devices where frequent keystrokes occur. Hereinafter, the present invention will be explained in further detail with reference to an example of mouse.

A mouse includes a key of the above construction, a main circuit board 8, a mouse detection chip, and a mouse bottom casing 9. The main circuit board 8 is mounted on the mouse bottom casing 9, while the mouse detection chip is mounted on the main circuit board 8. The displacement determination device 7 is electrically connected with the main circuit board 8. The mouse detection chip includes displacement information scanning module for scanning and sampling the displacement detection device; an information filter module for controlling a filter delay de-bouncing circuit to filter sampled values obtained by the displacement information scanning module; an information determination module for controlling a Schmitt Trigger to compare the sampled values filtered by the information filter module, and for sending a key information to a key switch output module when the sampled values are larger than the maximum value set by the trigger; and a key switch output module for receiving the key information from the information determination module and determining a corresponding code value based on the key information and reporting the same to a main computer. The filtering manners of the information filter module include mean filtering, IIR filtering and Jitter filtering. The cap 1 may be an entire upper closure of the mouse or only a single button cap for example for a mouse left key, middle key, or right key. A sound absorbing layer is disposed on the lower limit device 6. At this time, the spring 2 magnetically moves between the upper limit device 5 and lower limit device 6, thus producing feeling of click without crisp sound. In other words, this kind of mouse works with no sound. When there is no sound absorbing layer on the lower limit device 6, the spring 2 will still move between the upper limit device 5 and lower limit device 6, thus generating feeling of click while with crisp sound. In other words, this kind of mouse works with sound. Moreover, the mouse also includes a power supply device, a mouse wheel, other keys, a DPI key, a wireless containing housing device, a trackball device, a threaded locking device, and the like.

The working principle of the present invention is described below and includes the following steps:

a. A main computer is communicated with a main controller chip through a communication port and then is initialized;

b. The information scanning module of the mouse information detection chip performs scanning and sampling to all of the displacement mechanism connected to the circuit board;

c. The filter delay de-bouncing circuit of the information filter module filters sampled values obtained by the displacement information scanning module, and the filtering manners of the information filter module include mean filtering, IIR filtering and Jitter filtering;

d. The information determination module controls the Schmitt Trigger to compare the sampled values filtered by the information filter module, and sends key information to a key switch output module when the sampled values are larger than the maximum value set by the trigger, the entire process goes back to step b if the sampled values are lower than the maximum value of the trigger, and the information determination module sends key moving up information to the main computer if the sampled values are lower than a minimum value of the trigger; and e. The key switch output module receives the key information from the information determination module and determines a corresponding code value based on the key information and reports the same to a main computer.

The present invention may find its application in field of operation devices.

The invention claimed is:

1. A key comprising a cap, a spring, a magnet, a spring supporting device, an upper limit device, a lower limit device, a displacement detection device, and a displacement determination device; the spring is located below the cap and in addition, the spring is disposed on the spring supporting device; the magnet is placed on either of the upper limit device or lower limit device; the spring is magnetically pressed against the magnet; the displacement detection device is mounted on the spring and moves between the upper limit device and lower limit device following deformation of the spring; the cap is configured to generate a click motion; the displacement determination device is located at one side of the displacement detection device; the device moves back and forth with respect to the displacement determination device following the movement of the spring; and the displacement determination device is electrically connected with an external circuit.

2. The key according to claim 1, wherein the magnet is positioned close to one side of the upper limit device; and the lower limit device has a sound absorbing layer by which when the spring contacts the lower limit device, no sound will be generated.

3. The key according to claim 2, wherein the displacement determination device is an optical coupling tube, or capacitive sensor, or displacement sensor.

4. The key according to claim 1, wherein the key further comprises a pushing mechanism located underneath the cap, and a bottom of the pushing mechanism is pressed against the spring.

5. The key according to claim 4, wherein the displacement determination device is an optical coupling tube, or capacitive sensor, or displacement sensor.

6. The key according to claim 1, wherein the spring is a torsion spring, compression spring, tension spring, belleville spring, or a flat spring.

7. The key according to claim 6, wherein the displacement determination device is an optical coupling tube, or capacitive sensor, or displacement sensor.

8. The key according to claim 1, wherein the displacement determination device is an optical coupling tube, or capacitive sensor, or displacement sensor.

9. A mouse, comprising a key as recited in claim 1, a main circuit board, a mouse detection chip, and a mouse bottom casing; the main circuit board is mounted on the mouse bottom casing, while the mouse detection chip is mounted on the main circuit board; and the displacement determination device is electrically connected with the main circuit board.

10. The mouse according to claim 9, wherein the mouse detection chip comprises:
 a displacement information scanning module for scanning and sampling the displacement detection device;
 an information filter module for controlling a filter delay de-bouncing circuit to filter sampled values obtained by the displacement information scanning module;
 an information determination module for controlling a Schmitt Trigger to compare the sampled values filtered by the information filter module, and
 for sending a key information to a key switch output module when the sampled values are larger than the maximum value set by the trigger; and
 a key switch output module for receiving the key information from the information determination module and determining a corresponding code value based on the key information and reporting the same to a main computer.

11. The mouse according to claim 10, wherein the filtering manners of the information filter module comprises mean filtering, IIR filtering and Jitter filtering.

12. The mouse according to claim 11, wherein the mouse also comprises a power supply device, a mouse wheel, other keys, a DPI key, a wireless containing housing device, a trackball device, and a threaded locking device.

13. The mouse according to any one of claim 10, wherein the mouse also comprises a power supply device, a mouse wheel, other keys, a DPI key, a wireless containing housing device, a trackball device, and a threaded locking device.

14. The mouse according to claim 9, wherein the cap is an entire upper closure of the mouse or only a single button cap for a mouse left key, middle key, or right key.

15. The mouse according to claim 14, wherein the mouse also comprises a power supply device, a mouse wheel, other keys, a DPI key, a wireless containing housing device, a trackball device, and a threaded locking device.

16. The mouse according to claim 9, wherein the mouse also comprises a power supply device, a mouse wheel, other keys, a DPI key, a wireless containing housing device, a trackball device, and a threaded locking device.

* * * * *